(12) United States Patent
Ando

(10) Patent No.: US 11,504,861 B2
(45) Date of Patent: Nov. 22, 2022

(54) GRIPPING MECHANISM AND ASSEMBLY APPARATUS

(71) Applicant: KYOCERA Document Solutions Inc., Osaka (JP)

(72) Inventor: Satoshi Ando, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 190 days.

(21) Appl. No.: 17/071,167

(22) Filed: Oct. 15, 2020

(65) Prior Publication Data

US 2021/0129352 A1   May 6, 2021

(30) Foreign Application Priority Data

Oct. 31, 2019 (JP) .............................. JP2019-199282

(51) Int. Cl.
*B25J 15/00* (2006.01)

(52) U.S. Cl.
CPC ....... *B25J 15/0038* (2013.01); *B25J 15/0028* (2013.01)

(58) Field of Classification Search
CPC .......... B25J 15/0038; B25J 9/04; B66C 1/38; B66C 1/442; B66C 1/48

USPC .................................... 248/316.3; 294/102.1
See application file for complete search history.

(56) References Cited

U.S. PATENT DOCUMENTS

| | | | | | |
|---|---|---|---|---|---|
| 3,197,250 | A | * | 7/1965 | Trotta | B66C 1/48 294/102.1 |
| 3,780,923 | A | * | 12/1973 | Merola | B65G 15/00 74/25 |
| 6,474,711 | B2 | * | 11/2002 | Kazerooni | B66D 3/18 294/213 |

FOREIGN PATENT DOCUMENTS

| | | |
|---|---|---|
| JP | H07-185959 | 7/1995 |
| JP | H07-241733 | 9/1995 |

* cited by examiner

*Primary Examiner* — Saul Rodriguez
*Assistant Examiner* — Brendan P Tighe
(74) *Attorney, Agent, or Firm* — Lex IP Meister, PLLC

(57) ABSTRACT

A gripping mechanism includes a pair of inclined surfaces and rolling elements. The pair of inclined surfaces face each other, are inclined in opposite directions with respect to a vertical direction, and approach each other on a lower side. Each of the rolling elements is rollable on the respective inclined surfaces in an obliquely upward and downward direction. An opening space is formed between lower ends of the inclined surfaces, the opening space having a direction Y (horizontal) width smaller than a direction Y width of the respective rolling elements arranged in the direction Y.

6 Claims, 11 Drawing Sheets

GRIPPING MECHANISM AND ASSEMBLY APPARATUS

INCORPORATION BY REFERENCE

This application is based upon and claims the benefit of priority from the corresponding Japanese Patent Application No. 2019-199282 filed on Oct. 31, 2019, the entire contents of which are incorporated herein by reference.

FIELD

The present disclosure relates to a gripping mechanism and an assembly apparatus for gripping and releasing a component.

BACKGROUND

A typical assembly apparatus uses a chuck mechanism having a pair of chuck jaws for gripping and releasing a component. In this assembling apparatus, the component is held by the pair of chuck claws of the chuck mechanism, the chuck mechanism is conveyed to a predetermined position together with the component, and the component is released from the pair of chuck claws at the predetermined position.

However, the chuck mechanism of the typical assembling apparatus requires a power source such as a motor, a transmission mechanism for transmitting a power, and the like, and a structure thereof is complicated and easily broken.

SUMMARY

A gripping mechanism according to an aspect of the present disclosure includes a pair of inclined surfaces and rolling elements. The pair of inclined surfaces face each other, are inclined in opposite directions with respect to a vertical direction, and approach each other on a lower side. Each of the rolling elements is arranged in a horizontal direction and is rollable on the corresponding inclined surface in an obliquely upward and downward direction. An opening space is formed between lower ends of the inclined surfaces, the opening space having a horizontal width smaller than a horizontal width of the respective rolling elements arranged in the horizontal direction.

An assembling apparatus according to an aspect of the present disclosure includes a gripping mechanism according to the present disclosure and a drive unit. The drive unit moves the gripping mechanism in a vertical direction, and in a longitudinal direction and a lateral direction that are orthogonal to the vertical direction.

DETAILED DESCRIPTION

Figure 1:
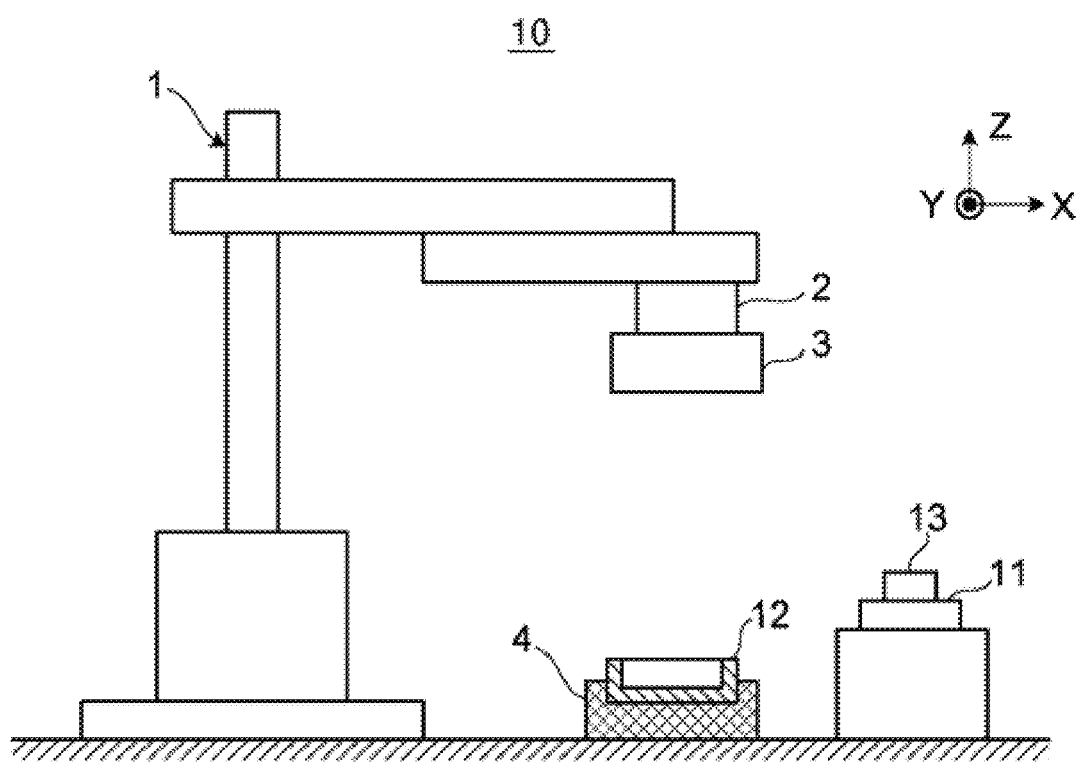
FIG. 1 is a schematic diagram illustrating a side view of an assembling apparatus according to an embodiment of the present disclosure.
Figure 2:
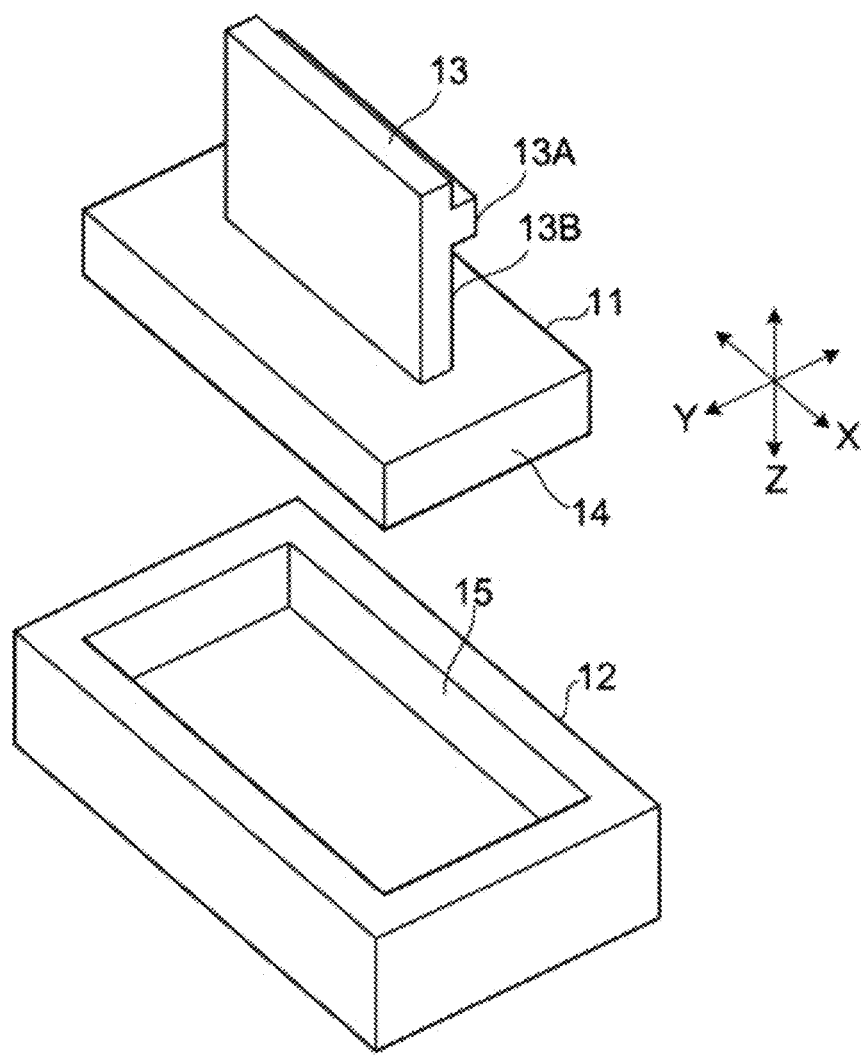
FIG. 2 is a diagram illustrating a perspective view of a first component and a second component to be assembled by the assemble apparatus of the present embodiment.
Figure 3A:
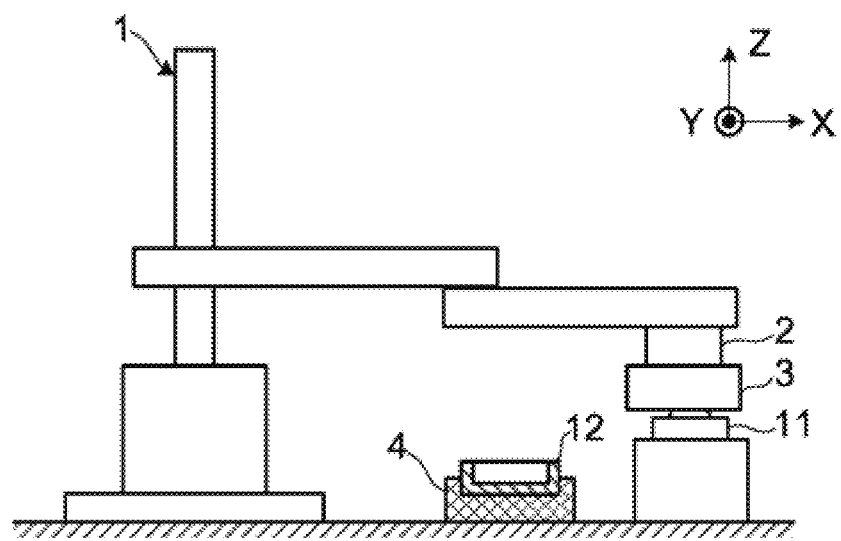
FIG. 3(A), FIG. 3(B), and FIG. 3(C) are diagrams illustrating side views of operation states of the assembling apparatus of the present embodiment.
Figure 3B:
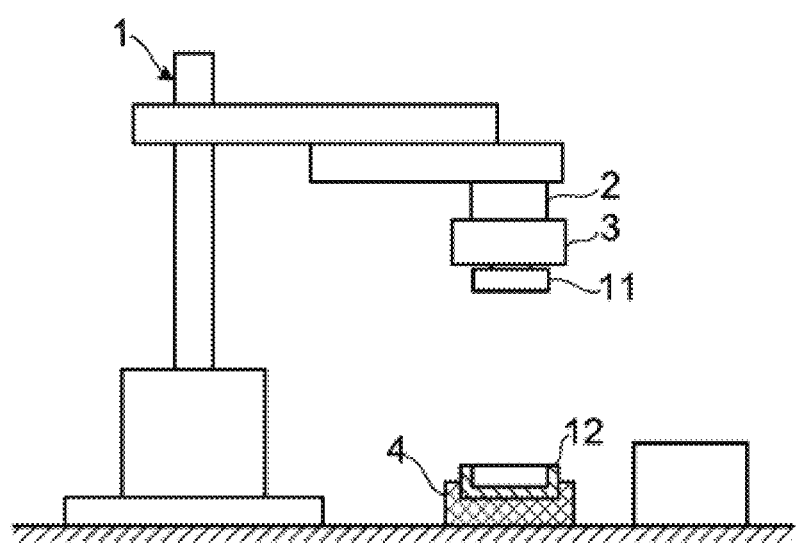
Figure 3C:
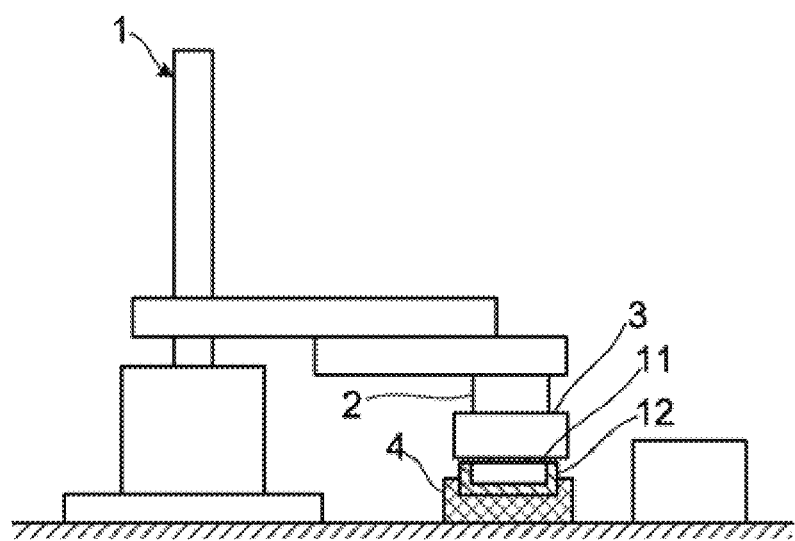

Hereinafter, a gripping mechanism and an assembling apparatus according to an embodiment of the present disclosure will be described with reference to the drawings. FIG. 1 is a schematic diagram illustrating a side view of an assembling apparatus according to an embodiment of the present disclosure. FIG. 2 is the diagram illustrating a first component and a second component to be assembled by the assemble apparatus of the embodiment. FIG. 3(A), FIG. 3(B), and FIG. 3(C) are the diagrams illustrating side views of operation states of the assembling apparatus of the embodiment. In FIG. 1 to FIG. 3(C), an up-down direction (a direction parallel to a vertical direction) Z, a left-right lateral direction X orthogonal to the vertical direction, and a front-rear longitudinal direction Y orthogonal to the vertical direction (a horizontal direction in the Claims) are illustrated. In FIG. 4 to FIG. 7(C), an up-down direction Z, a left-right lateral direction X, and a front-rear longitudinal direction Y are also illustrated.

As illustrated in FIG. 1, the assembly apparatus 10 of the present embodiment includes a robot 1, a positional deviation correction device 2 attached to a tip end of an arm of the robot 1, and a gripping mechanism 3 supported by the positional deviation correction device 2. The positioning mechanism 4 is provided at a predetermined position with respect to the robot 1. The first component 11 is provided at a predetermined position with respect to the robot 1, and the second component 12 is positioned by the positioning mechanism 4.

The robot 1 moves the positional deviation correction device 2 and the gripping mechanism 3 in the up-down direction Z, the left-right lateral direction X, and the front-rear longitudinal direction Y. The positional deviation correction device 2 corrects the position of the gripping mechanism 3. The gripping mechanism 3 grips and releases a protruding part 13 of the first component 11.

As illustrated in FIG. 2, the first component 11 includes a convex part 14 and the protruding part 13 protruding upward from the convex part 14. The convex part 13A is formed on the tip side of the protruding part 13, and the lower side of the convex part 13A of the protruding part 13 is constituted of a flat plate part 13B. The second component 12 has a concave part 15 into which the convex part 14 of the first component 11 is fitted.

Here, as illustrated in FIG. 3(A), the robot 1 moves the positional deviation correction device 2 and the gripping mechanism 3 in the lateral direction X and the longitudinal direction Y to position the gripping mechanism 3 above the first component 11. Subsequently, the robot 1 moves the position deviation correction device 2 and the gripping mechanism 3 in the downward direction Z to couple the gripping mechanism 3 to the protruding part 13 of the first component 11. The gripping mechanism 3 grips the protruding part 13 of the first component 11.

Thereafter, as illustrated in FIG. 3(B), the robot 1 moves the positional deviation correction device 2 and the gripping mechanism 3 in the upward direction Z to lift the first component 11, and moves the positional deviation correction device 2 and the gripping mechanism 3 in the lateral direction X and the longitudinal direction Y to position the gripping mechanism 3 directly above the second component 12. Then, as illustrated in FIG. 3(C), the robot 1 moves the positional deviation correction device 2 and the gripping mechanism 3 in the downward direction Z to fit the convex part 14 of the first component 11 into the concave part 15 of the second component 12. At this time, the positional deviation correction device 2 detects the direction of the force operating on the first component 11, adjusts the position of the gripping mechanism 3 according to the direction of the force, corrects the positional deviation of the convex part 14 of the first component 11 with respect to the concave part 15 of the second component 12, and fits the convex part 14 with respect to the concave part 15.

Further, the robot 1 moves the positional deviation correction device 2 and the gripping mechanism 3 in the left or right lateral direction X to release the protruding part 13 of the first component 11 from the gripping mechanism 3, and moves the positional deviation correction device 2 and the gripping mechanism 3 in the upward direction Z and also move them in the lateral direction X and the longitudinal direction Y. As illustrated in FIG. 1, the robot 1 returns the positional deviation correction device 2 and the gripping mechanism 3 to their original positions.

Figure 4:
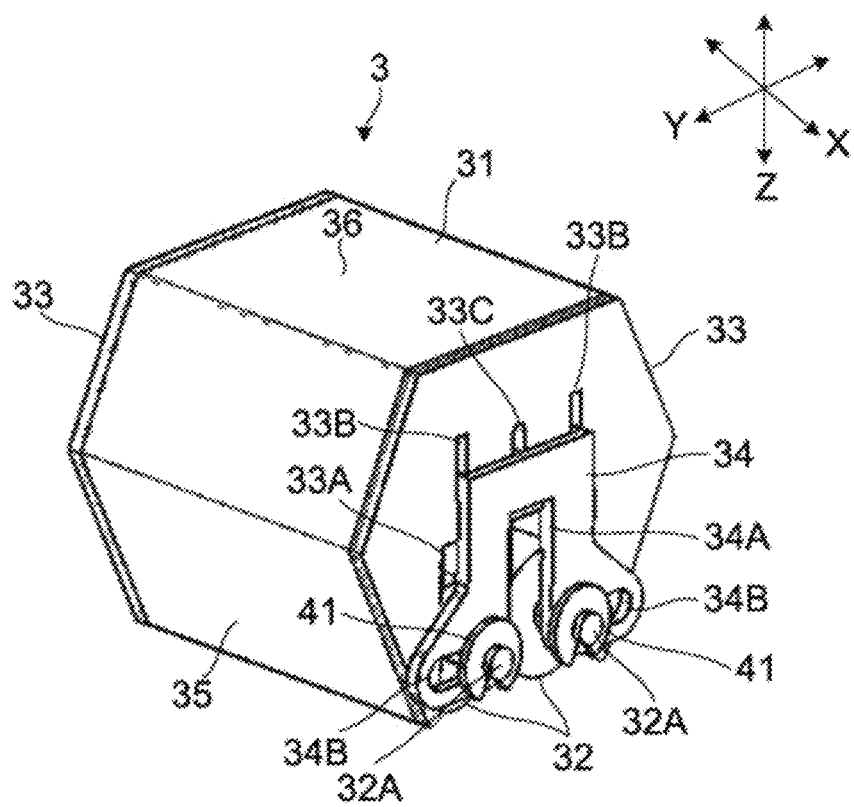
FIG. 4 is a diagram illustrating a perspective view of a gripping mechanism in the assembling apparatus of the present embodiment.
Figure 5:
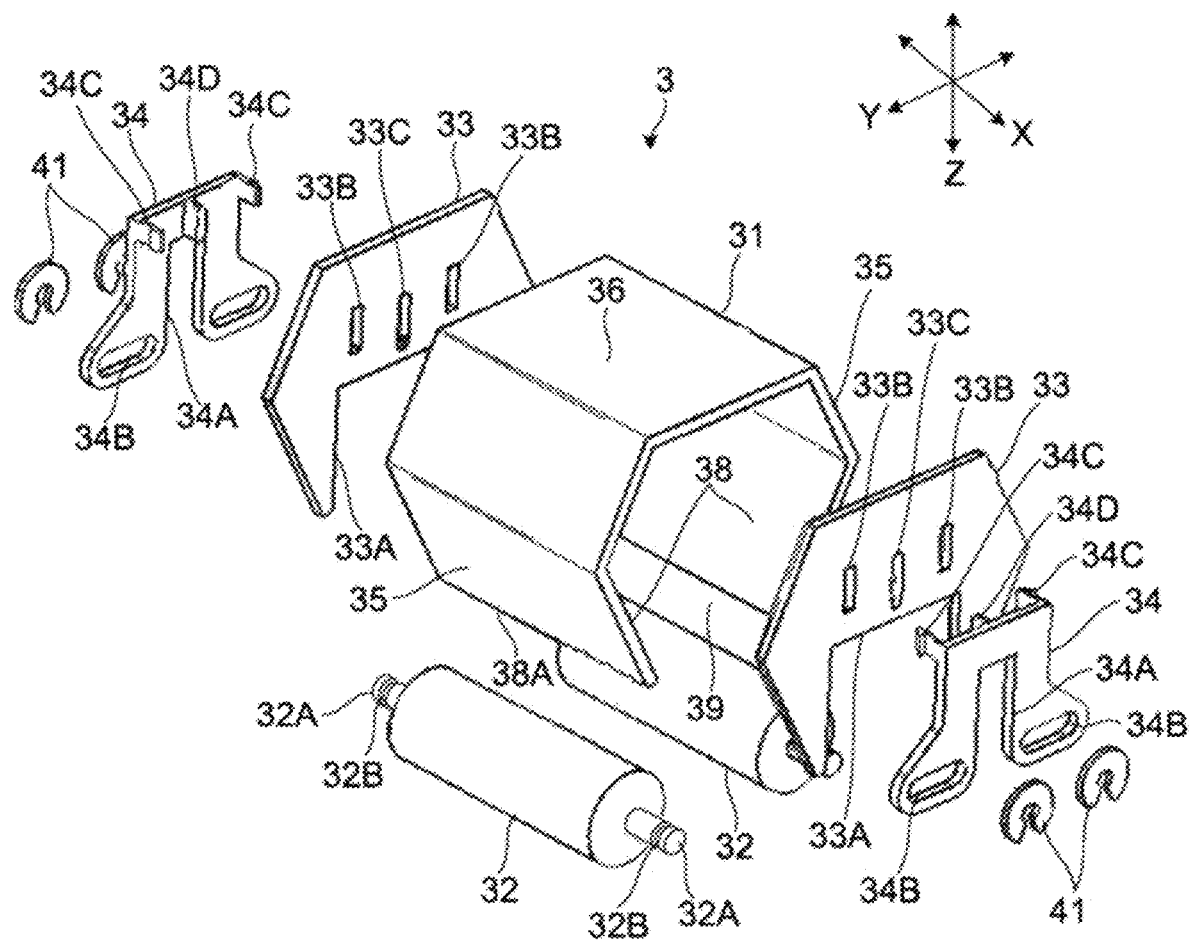
FIG. 5 is a diagram illustrating an exploded perspective view of the gripping mechanism.
Figure 6:
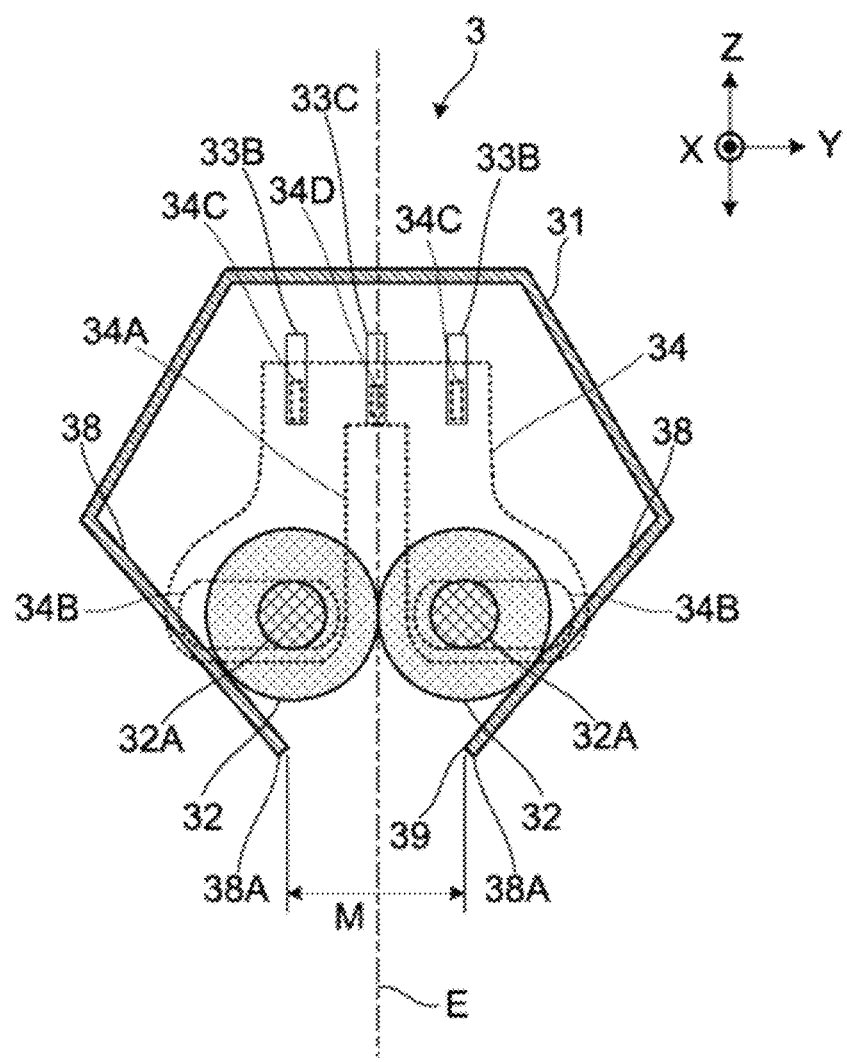
FIG. 6 is a diagram illustrating a longitudinal cross-sectional view of the gripping mechanism.

Next, the gripping mechanism 3 will be described in detail with reference to FIG. 4, FIG. 5, and FIG. 6. FIG. 4 is the diagram illustrating the perspective view of the gripping mechanism 3. FIG. 5 is the diagram illustrating the exploded perspective view of the gripping mechanism 3. FIG. 6 is the diagram illustrating the longitudinal cross-sectional view of the gripping mechanism 3.

As illustrated in FIG. 4 to FIG. 6, the gripping mechanism 3 includes a housing 31, a pair of rolling elements 32 provided inside the housing 31, side wall parts 33 provided on both sides of the opening part on the side of the housing 31, and support members 34 provided outside the side wall parts 33 in an overlapping manner.

The housing 31 includes a pair of bent wall parts 35 bent in an "L" shape facing each other, and an upper wall part 36 connecting the respective bent wall parts 35. The housing 31 is formed by, for example, cutting and bending a metal plate.

Lower inner peripheral surfaces of the respective bent wall parts 35 are configured as respective inclined surfaces 38 that face each other, are inclined in opposite directions with respect to the up-down direction (the direction parallel to the vertical direction) Z, and approach each other as they go downward. Between the lower ends 38A of the inclined surfaces 38, an opening space 39 is formed between the lower ends of the respective inclined surfaces 38. The opening space 39 has a width in the longitudinal direction Y (the horizontal direction) smaller than the width in the longitudinal direction Y of the rolling elements 32 arranged in the horizontal direction. That is, the width M of the opening space 39 is set to be smaller than the distance M obtained by adding the outer diameters of the rolling elements 32.

Each of the rolling elements 32 has a cylindrical shape having the same diameter and the same weight as each other. An annular groove 32B is formed at the end of the shaft 32A of each rolling element 32. As will be described later, the rolling elements 32 roll and move downward on the respective inclined surfaces 38 by their own weights, and the protruding part 13 of the first component 11 is sandwiched between the rolling elements 32. The weight of the respective rolling elements 32 and the friction coefficient of the surface of the respective rolling elements 32 are set to values preferable for sandwiching and gripping the protruding part 13 of the first component 11.

Each of the side wall parts 33 as a vertical support part has an outer shape corresponding to a side opening part formed by an outer periphery of the housing 31. An opening part 33A opened downward is formed on the lower side of the respective side walls 33. Three vertical slits 33B, 33C, and 33B are provided above the opening part 33A in the respective side walls 33.

A long opening part 34A opened downward is formed in the respective support members 34 as a horizontal-direction support part. Two horizontal slide holes 34B extending horizontally (in the longitudinal direction Y) are formed in the lower end part of the respective support members 34 at positions on the side of the opening part 34A so as to sandwich the opening part 34A. A hooked convex part 34C, anon-hooked convex part 34D, and a hooked convex part 34C protruding to the side of the respective side wall parts 33 are provided on the upper portion of the respective support members 34.

Each of the inclined surfaces 38 of the housing 31 and each of the horizontal slide holes 34B of the respective support members 34 are arranged symmetrically with respect to a vertical line E passing through the center of the opening space 39.

Each of the rolling elements 32 is arranged inside the housing 31, and each of the side wall parts 33 is overlapped and fixed to wall ends of both side parts in the axial direction of the housing 31 in a state that both end parts in the axial direction of the shaft 32A of the respective rolling element 32 are protruded to the outside of the respective side wall parts 33 from the opening part 33A of the respective side wall parts 33. Each of the support members 34 is overlapped on the outside of the respective side wall parts 33, and the both end parts of the shaft 32A of the respective rolling elements 32 are protruded to the outside from the horizontal slide hole 34B of the respective support members 34. In each of the support members 34, each retaining washers 41 is fitted in the annular groove 32B at both ends of the shaft 32A of the respective rolling elements 32. Thus, the shafts 32A of the respective rolling elements 32 are horizontally movably and rotatably engaged with the horizontal slide holes 34B of the respective support members 34, and supported at the same height position as each other by the horizontal slide holes 34B.

As illustrated in FIG. 5, each of the hooked convex part 34C, the non-hooked convex parts 34D, and the hooked convex part 34C of the respective support members 34, which are arranged side by side, is inserted into a corresponding one of the vertical slits 33B, 33C, and 33B of the respective side wall parts 33. Once the 2 hooked convex parts 34C, 34C are inserted into the respective vertical slits 33B, 33B, the hooked tips of the respective hooked convex parts 34C, 34C are caught by the respective vertical slits 33B, 33B. Therefore, the hooked convex parts 34C, 34C are less likely to exit from the respective vertical slits 33B, 33B, and the respective support members 34 are engaged with the respective side wall parts 33. At the same time, the respective retaining washers 41 prevent the respective support members 34 from existing from the both ends of the shaft 32A of the respective rolling elements 32. Therefore, each of the support members 34 is stably supported on the outer side of the respective side wall parts 33.

The hooked convex part 34C, the non-hooked convex part 34D, and the hooked convex part 34C of the respective support members 34 are inserted into the vertical slits 33B, 33C, and 33B, respectively, which are longer in longitudinal width (the width in the Z direction) than the convex parts 34C, 34D, and 34C. Therefore, each of the support members 34 is supported so as to be movable only in the vertical direction (the up-down direction Z) with respect to each of the side wall parts 33.

Accordingly, each of the side wall parts 33 is fixed to the housing 31, each of the support members 34 is supported movably in the vertical direction with respect to each of the side wall parts 33, and the both end parts of the shaft 32A of the respective rolling elements 32 are supported movably in the horizontal direction along the horizontal slide hole 34B of the respective support members 34. Thus, the shaft 32A of the respective rolling elements 32 is supported by the housing 31 so as to be movable horizontally (in the longitudinal direction Y) and vertically (in the longitudinal direction Y) and vertically (in the up-down direction Z) via the support members 34 and the side wall parts 33.

Figure 7A:
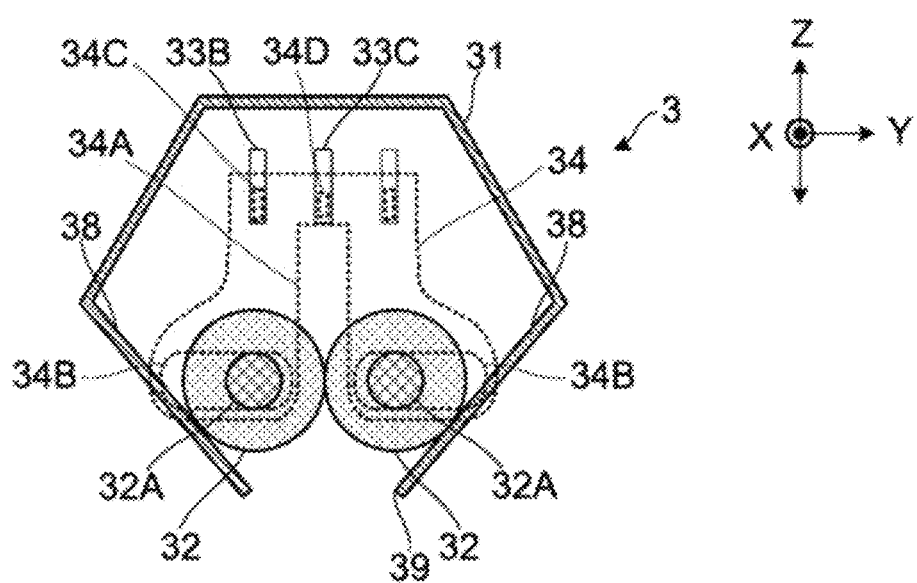
FIG. 7(A), FIG. 7(B), and FIG. 7(C) are diagrams illustrating cross-sectional views of the operation states of the gripping mechanism.

In the gripping mechanism 3 having the above-described configuration, as illustrated in FIG. 1, when the gripping mechanism 3 is separated from the first component 11 and is positioned above the first component 11, the rolling elements 32 roll obliquely downward on the respective inclined surfaces 38 by their own weights until they come into contact with each other as illustrated in FIG. 7(A), and approach the opening space 39 of the housing 31.

At this time, as in the above description, each of the rolling elements 32 is cylindrical in shape and has the same size and weight as each other, and rolls on the respective inclined surfaces 38, the shaft 32A of the respective rolling elements 32 is supported at the same height position by the horizontal slide holes 34B of the respective support members 34, and the respective inclined surfaces 38 are arranged symmetrically with respect to the vertical line E passing through the center of the opening space 39. Thus, each of the rolling elements 32 is brought into contact with each other at the position of the central vertical line E.

Figure 7B:
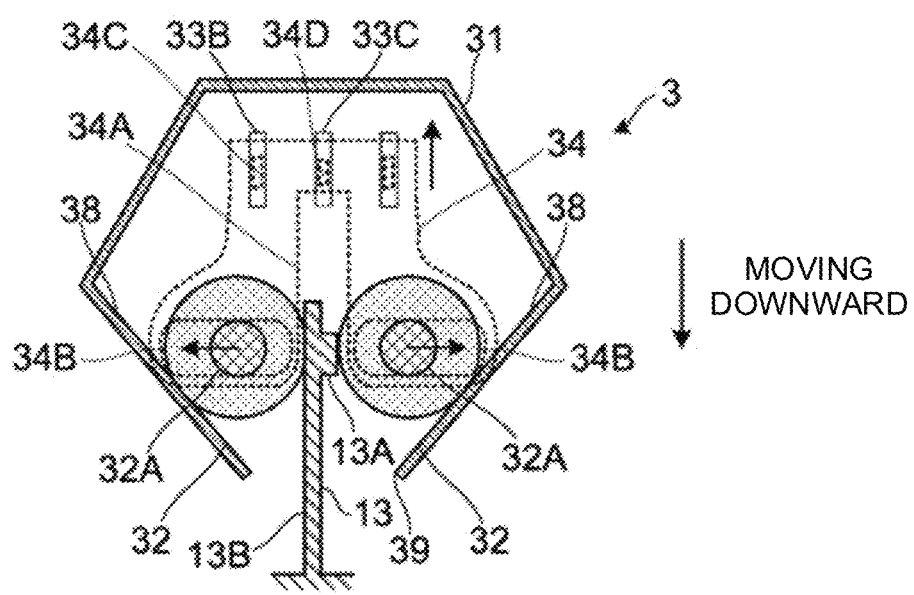

Then, when the gripping mechanism 3 is moved in the downward direction Z, and reaches the protruding part 13 of the first component 11 as illustrated in FIG. 3(A), in the gripping mechanism 3, the protruding part 13 of the first component 11 enters the inside of the housing 31 through the opening space 39 of the housing 31 and pushes up the respective rolling elements 32, as illustrated in FIG. 7(B). Each of the rolling elements 32 rolls obliquely upward on the respective inclined surfaces 38 against their own weights, and is separated from each other. Thus, the protruding part 13 of the first component 11 enters between the respective rolling elements 32. When the convex part 13A on the tip side of the protruding part 13 passes between the respective rolling elements 32, the respective rolling elements 32 are most separated. As each of the rolling elements 32 rolls obliquely upward, the shaft 32A of the respective rolling elements 32 moves away from each other along the horizontal slide holes 34B of the respective support members 34, and the respective support members 34 move upward.

Figure 7C:
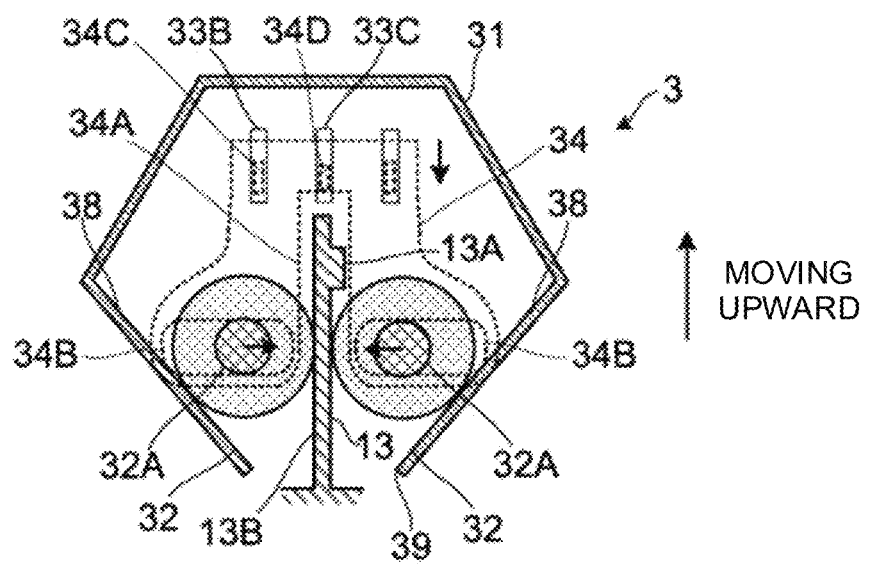

Subsequently, the gripping mechanism 3 is further moved in the downward direction Z, and as illustrated in FIG. 7(C), the flat plate part 13B of the protruding part 13 reaches between the respective rolling elements 32. Thus, each of the rolling elements 32 slightly rolls obliquely downward on the respective inclined surfaces 38 by their own weights, and comes close to each other to sandwich the flat plate part 13B. As each of the rolling elements 32 rolls obliquely downward, each of the shafts 32A of the respective rolling elements 32 moves toward each other along the respective horizontal slide holes 34B of the respective support members 34, and the support members 34 move downward.

In this state, when the gripping mechanism 3 is moved in the upward direction Z, in the gripping mechanism 3, each of the rolling elements 32 further slightly rolls obliquely downward on the respective inclined surfaces 38 by its own weight. As a result, the protruding part 13 of the first component 11 is slightly lowered between the respective rolling elements 32, and the protruding part 13 of the first component 11 is reliably gripped between the rolling elements 32. Therefore, the first component 11 is moved in the upward direction Z along with the movement of the gripping mechanism 3 in the upward direction Z without falling.

Here, if the convex part 13A of the protruding part 13 of the first component 11 is sandwiched between the respective rolling elements 32, the contact position of the respective rolling elements 32 with respect to the convex part 13A becomes unstable, and the protruding part 13 of the first component 11 is not stably held. In the present embodiment, the gripping mechanism 3 is moved in the downward direction Z, until the flat plate part 13B of the protruding part 13 reaches between the respective rolling elements 32 and the flat plate part 13B is sandwiched between the respective rolling elements 32. Therefore, the contact position of the respective rolling elements 32 with respect to the flat plate part 13B is stable, and the protruding part 13 of the first component 11 is reliably gripped between the respective rolling elements 32.

Further, as in the above description, the weight of each rolling element 32 and the friction coefficient of the surface of each rolling element 32 are set to values suitable for sandwiching and gripping the protruding part 13 of the first component 11. Accordingly, due to the weight of the respective rolling elements 32, the friction force necessary and sufficient for the flat plate part 13B of the protruding part 13 of the first component 11 to be gripped and supported is generated between the respective rolling elements 32 rolling obliquely downward on the respective inclined surfaces 38.

Further, each of the rolling elements 32 is the cylindrical shape of the same size as each other, each of the inclined surfaces 38 is arranged symmetrically with respect to the vertical line E passing through the center of the opening space 39, and each of the rolling elements 32 is supported at the same height position by the respective horizontal slide holes 34B of the respective support members 34. Thus, the contact positions of the respective rolling elements 32 with the flat plate part 13B of the protruding part 13 become the same height as each other. In addition, each of the rolling elements 32 is in line contact with the flat plate part 13B of the protruding part 13. Therefore, the flat plate part 13B of the protruding part 13 is stably held by the line contact at the same height of the respective rolling elements 32 with both surfaces of the flat plate part 13B. At the same time, the flat plate part 13B hangs down substantially vertically.

Thereafter, as illustrated in FIG. 3(B) and FIG. 3(C), when the gripping mechanism 3 is positioned directly above the second component 12 and the convex part 14 of the first component 11 supported by the gripping mechanism 3 is fitted into the concave part 15 of the second component 12, the protruding part 13 of the first component 11 slightly slides up the gripping mechanism 32, in the gripping mechanism 3. Thus, each of the rolling elements 32 rolls obliquely upward on the respective inclined surfaces 38 and is slightly separated from each other. In this state, when the robot 1 moves the positional deviation correction device 2 and the gripping mechanism 3 in the left or right lateral direction X as in the above description, the protruding part 13 of the first component 11 is moved to the outside of the housing 31 through the opening part 33A of the side wall part 33 of the housing 31 and the opening part 34A of the support member 34. Thus, the protruding part 13 of the first component 11 is released from the gripping mechanism 3.

Further, the robot 1 returns the positional deviation correction device 2 and the gripping mechanism 3 to their original positions as illustrated in FIG. 1.

As in the above description, in the gripping mechanism 3 of the present embodiment, the each of the rolling elements 32 that rolls on the respective inclined surfaces 38 of the housing 31 are provided, and the protruding part 13 of the first component 11 is gripped between the respective rolling elements 32 that roll obliquely downward by their own weight. Thus, the gripping mechanism 3 has a simple structure, does not require a power source, and hardly breaks down.

In addition, even when the convex part 13A is present in the protruding part 13 of the first component 11, the gripping mechanism 3 sandwiches the flat plate part 13B of the protruding part 13 between the respective rolling elements 32 while avoiding the convex part 13A. Accordingly, the protruding part 13 of the first component 11 is stably gripped.

Further, each of the rolling elements 32 is brought into line contact with both surfaces of the flat plate part 13B of the protruding part 13 at the same height to sandwich the flat plate part 13B. Accordingly, the flat plate part 13B is gripped more stably.

The configurations of the above-described embodiments described with reference to FIG. 1 to FIG. 7(C) are examples of the present disclosure, and the present disclosure is not limited to the configurations of the examples.

What is claimed is:

1. A gripping mechanism comprising:
a pair of inclined surfaces that are arranged facing each other, and are inclined in opposite directions with respect to a vertical direction, and approach each other on a lower side;
rolling elements, each of which is arranged in a horizontal direction and is rollable on the respective inclined surfaces in an obliquely upward and downward direction; and
an opening space formed between lower ends of the inclined surfaces, the opening space having a horizontal width smaller than a horizontal width of the respective rolling elements arranged in the horizontal direction;
a horizontal support part that is bridged over an end part of a shaft of each of the rolling elements and supports the end part of the shaft of each of the rolling elements so as to be movable in the horizontal direction; and
a vertical support part that supports the horizontal support part to be movable in the vertical direction,
wherein
the vertical support part includes vertical slits provided above the opening space in the vertical support part, and
the horizontal support part includes a plurality of hooked convex parts and a non-hooked convex part, the hooked convex parts and the non-hooked part being inserted into the respective vertical slits.

2. The gripping mechanism according to claim 1, further comprising:
an opening part that communicates from an inside to an outside of the respective inclined surfaces, the opening part being provided on a side part of the respective inclined surfaces.

3. The gripping mechanism according to claim 1, wherein each of the rolling elements is rollable downward on the respective inclined surfaces by its own weight.

4. The gripping mechanism according to claim 1, wherein each of the rolling elements has a cylindrical shape with the same diameter as each other.

5. The gripping mechanism according to claim 1, wherein the respective inclined surfaces are arranged symmetrically with respect to a vertical line passing through a center of the opening space.

6. An assembly apparatus comprising:
a gripping mechanism; and
a drive unit that moves the gripping mechanism in a vertical direction, and in a longitudinal direction and a lateral direction orthogonal to the vertical direction,
wherein
the gripping mechanism includes:
a pair of inclined surfaces that are arranged facing each other, and are inclined in opposite directions with respect to a vertical direction, and approach each other on a lower side;
rolling elements, each of which is arranged in a horizontal direction and is rollable on the respective inclined surfaces in an obliquely upward and downward direction;
a horizontal support part that is bridged over an end part of a shaft of each of the rolling elements and supports the end part of the shaft of each of the rolling elements so as to be movable in the horizontal direction; and
a vertical support part that supports the horizontal support part to be movable in the vertical direction,
wherein
an opening space is formed between lower ends of the inclined surfaces, the opening space having a horizontal width smaller than a horizontal width of the respective rolling elements arranged in the horizontal direction and
wherein
the vertical support part includes vertical slits provided above the opening space in the vertical support part, and
the horizontal support part includes a plurality of hooked convex parts and a non-hooked convex part, the hooked convex parts and the non-hooked part being inserted into the respective vertical slits.

* * * * *